United States Patent [19]
Karnoski

[11] Patent Number: 5,997,784
[45] Date of Patent: Dec. 7, 1999

[54] METHOD OF MANUFACTURE OF WOOD SUBSTITUTE ARTICLES

[76] Inventor: Wayne Karnoski, 724 Via Los Santos, San Dimas, Calif. 91773

[21] Appl. No.: 09/003,400

[22] Filed: Jan. 6, 1998

[51] Int. Cl.[6] .................................................. B29C 44/20
[52] U.S. Cl. .............................. 264/51; 264/54; 264/101; 264/115; 264/120; 264/321
[58] Field of Search .............................. 264/54, 109, 115, 264/51, 120, 101, 321

[56] References Cited

U.S. PATENT DOCUMENTS

| | | | |
|---|---|---|---|
| 4,358,418 | 11/1982 | Heggenstaller | 264/108 |
| 4,680,328 | 7/1987 | Dohrer et al. | 524/137 |
| 5,249,948 | 10/1993 | Koslow | 425/376.1 |
| 5,288,772 | 2/1994 | Hon | 524/35 |
| 5,413,745 | 5/1995 | Andersson | 264/68 |
| 5,786,000 | 7/1998 | Berner | 425/140 |
| 5,847,016 | 12/1998 | Cope | 521/84.1 |

*Primary Examiner*—Allan R. Kuhns
*Attorney, Agent, or Firm*—Roy A. Ekstrand

[57] ABSTRACT

A wood substitute material is formed by mixing a base polymer with wood fiber or wood flour together with a quantity of lignin and thereafter creating a molten material within a compounder and extruder. The molten material is extruded or injection molded to form the desired shape. Prior to extrusion or injection molding, a foaming agent is added to the molten mixture resulting in the creation of a variable density extruded or injection molded article. In the extrusion process, a conventional extrusion die is employed having a die passage which is significantly larger than the desired eventual size of the extruded article. The enlarged extrusion is thereafter cooled and reduced in sized through a series of vacuum sizers and a final water bath prior to cutting. The degree of foaming within the extruded article is controlled by the amount of foaming agent employed.

5 Claims, 3 Drawing Sheets

METHOD OF MANUFACTURE OF WOOD SUBSTITUTE ARTICLES

SPECIFICATION

1. Field of the Invention

This invention relates generally to wood substitute materials and products and particularly to a method of manufacture of various articles utilizing such wood substitute material.

2. Background of the Invention

For many years, wood material has been a primary construction material for virtually every building, dwelling or other facility fabricated within the industrial nations of the world. Notwithstanding the extensive use of steel and other materials in fabricating various structures, the continuing use of and demand for building materials fabricated using wood has grown. Wood material is often utilized for structural elements as well as various molding, decking, flooring and decorative trim components of modern dwellings. In addition, furniture and other elements such as paneling or doors and cabinetry have made still greater demands upon the need for wood in construction of structures. Many items fabricated from wood are, in essence, long relatively small cross-section elements such as molding, framing, trim and the like. Often these elements are shaped to have relatively complex cross-sections which while decorative or suited to the particular purpose in fabrication of the structure are often also very wasteful in terms of quantity of wood required to produce them. For example, the fabrication of molding or framing material often requires that the complex shape be obtained through cutting away substantial portions of the material which then becomes discarded waste.

Thus, despite the excellence of wood as a component in manufacturing and constructing various dwellings and structures, several limitations in the cost effectiveness and desirability of wood in such applications arise. For example, wood products are, of course, formed from cutting trees and, in essence, utilizing the major trunk or branch portions in the manufacture of wood products. This cutting of trees decreases the environmentally desirable presence of mature trees and often destroys wooded areas. This in turn diminishes the overall environment of the land and may have extreme effects upon wildlife habitat and general quality of living. Further, wood has become an extremely costly building material due in part to the continuing shortage of available mature trees. While environmental laws have had some impact upon the wholesale cutting of forests for wood products in the form of mandatory tree planting, it is a fact of life that it takes many years to replace mature trees which have been harvested for wood products.

In addition to the general cost and difficulty associated with wholesale use of wood products in construction, much of the wood in general board fabrication is wasted material. A substantial amount of sawdust is created together with pulp materials such as branches or the like as the lumber producers endeavor to transform a harvested tree into a collection of elongated boards and planks for use in fabrication of structures.

The foregoing limitations and problems associated with unlimited use of wood products has created an awareness for the need of reducing wood use and the wastefulness of the wood fabrication process. From an environmental standpoint, there arose a substantial trend directed toward recycling wood products and wood waste materials such as sawdust or pulp in an effort to reduce the consumption of wood. It was thought that the reduction of wood consumption through recycling efforts would in turn reduce the number of trees harvested to supply the demand. As a result, the art has developed a number of recycling processes to produce products without utilizing newly harvested trees. One of the most successful has been the paper and pulp industry. In addition, attempts have been made to manufacture products as substitutes for virgin wood utilizing wood fiber or particles together with various binder materials. Such products have become available and are generally known as "fiber board" or "particle board". In addition the use of wood particles together with plastic binders have created so-called plastic wood.

While the foregoing described attempts to provide an environmentally favorable and cost-effective wood substitute have to some extent succeeded, they have thus far failed to provide an economically favorable viable wood substitute material. The presently available wood substitutes have also failed to effectively reduce the waste of wood material inasmuch as they lack the capability to be easily formed or shaped into products which replace wasteful virgin wood products such as trim, molding or framing. The products generate substantial waste of wood material. Thus, because such wood substitute materials are not easily formed or shaped into elongated elements such as molding, trim or framing elements, they do not replace virgin wood in these wasteful products. In addition, the cost associated with such wood substitutes has also failed to yield a sufficient cost benefit to warrant a switch from virgin wood products to substitute products. There remains, therefore, a continuing need in the art for a viable wood substitute which is readily formed into elongated elements such as molding, trim or framing elements and which maintains the desirable characteristics of wood when used in the building process. There remains a further need for such a wood substitute which is environmentally beneficial and makes maximum use of recycled material without creating or introducing undesirable elements into the environment.

SUMMARY OF THE INVENTION

Accordingly, it is a general object of the present invention to provide an improved wood substitute and method of manufacturing articles therefrom. It is a more a particular object of the present invention to provide an improved wood substitute which utilizes recycled polymers and reusable byproducts from the wood and pulp industries. It is a still more particular object of the present invention to provide an improved wood substitute and method of manufacture of articles therefrom which facilitates the production of low cost extruded or molded items fabricated from a viable wood substitute.

In accordance with the present invention, there is provided a method of forming a wool substitute article comprising the steps of: mixing a base polymer, wood flour and lignin to form a mixture; compounding the mixture under elevated pressure and temperature to form a molten material; adding a foaming agent to the molten material; extruding the molten material to an enlarged cross-section billet; vacuum sizing the enlarged cross-section billet to reduce the cross-section thereof, cool the billet and allow a foaming action to occur within the billet to form a reduced size cooled billet; and final cooling the reduced size billet.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
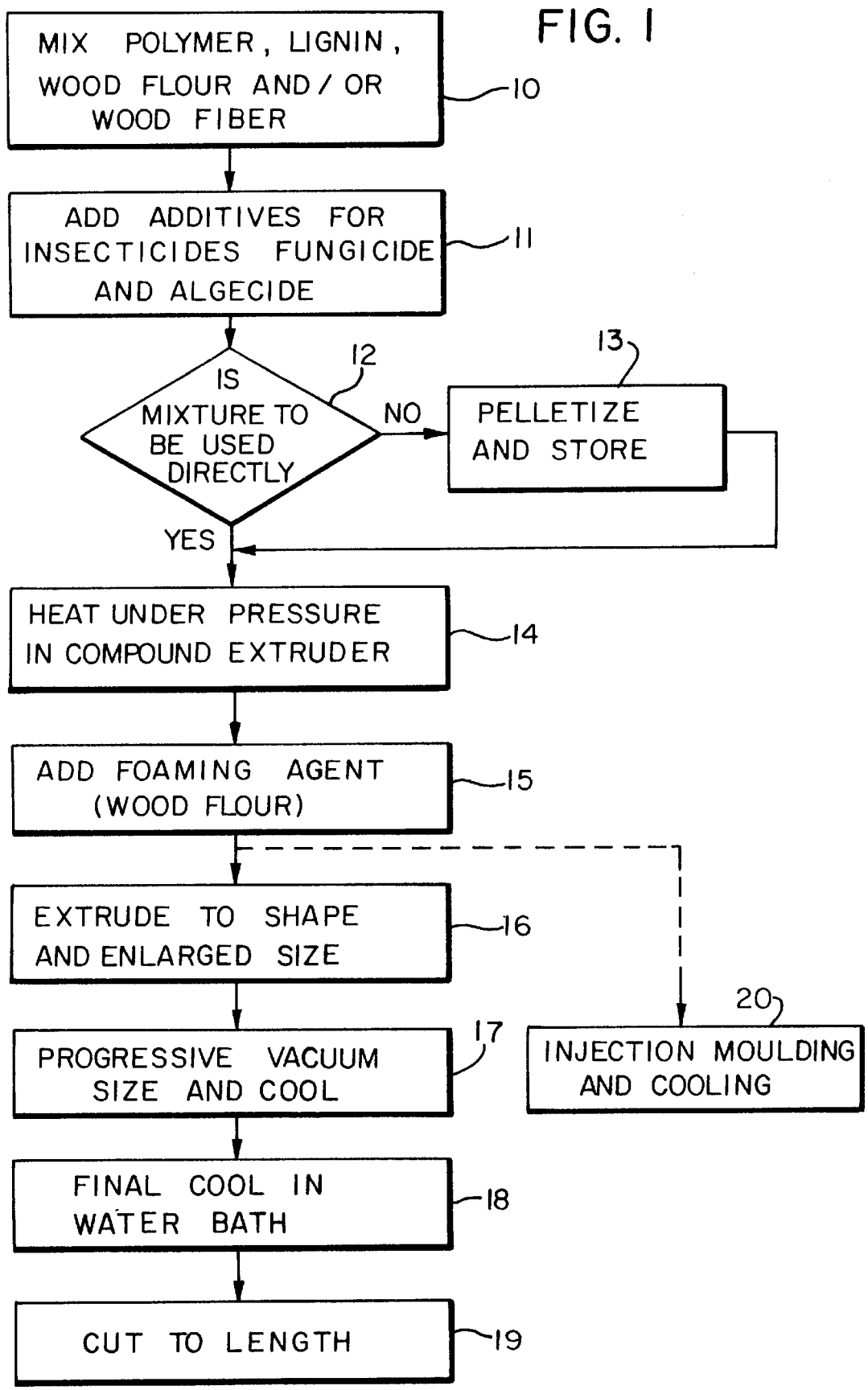
FIG. 1 sets forth a flow diagram of the present invention method of manufacturing articles formed of the present invention wood substitute.

By way of overview, the present invention wood substitute is fabricated using an integrated process that includes the use of recycled polymers and reusable byproducts from the wood and pulp industries. The present invention process utilizes the combination of compounding with extrusions or injection molding to form articles. In further accordance with the present invention process, the recycled polymers and reusable byproducts from wood and pulp industries are combined within an extruder under high pressure and elevated temperature and are thereafter extruded to an elongated item having an enlarged cross-section corresponding to the desired article. Thereafter, continuous cooling and shaping and forming is applied to the enlarged extrusion to gradually reduce and cool the extruded article to the desired shape and size. In addition and in further accordance with the present invention, additional foaming agents such as additional wood flour are added during the extrusion process prior to extruding the enlarged item to facilitate internal foaming of the extruded article during the cooling and sizing process. This foaming provides a lower density interior while maintaining the desired surface characteristics of the article.

The basic formula for the present invention wood substitute is set forth below in Table 1.

TABLE 1

| Ingredient | Percentage by Weight |
| --- | --- |
| Base Polymer | 50 to 70 Percent |
| Wood Fiber or Wood Flour | 20 to 40 Percent |
| Lignin | 5 to 20 Percent |

The present invention wood substitute utilizes a base polymer such as polypropylene or polyvinyl chloride. Alternatively, however, virtually any common copolymer may be utilized as the base polymer. The wood flour utilized is formed by pulverizing sawdust to a fine powder consistency. The wood fiber is preferably provided using the sludge formed as a byproduct of pulping or paper recycling. Such sludge is normally disposed of in the paper pulping or recycling process. Thus, utilization of such material further enhances the recycling characteristic and environmental desirability of the present invention wood substitute. The lignin is utilized as an additive and is typically obtained as a leftover byproduct of ethanol manufacture or fermentation or other pulping operations. Lignin provides an adhesive-like material which is the naturally occurring adhesive within trees. The formula set forth in Table 1 above may be supplemented by further adding color materials or ultraviolet light inhibitors such as zinc compounds or the like. By way of further variation, a rubber material may be added to obtain a less rigid characteristic. Further additions to the basic formula may be utilized in the form of additives such as insecticides, fungicides and algaecides as needed. Of particular advantage in the present invention as will be apparent to those skilled in the art is the complete fabrication of the present invention wood substitute utilizing recycled materials or materials which form byproducts of other wood and paper processes and which are normally discarded at some expense and environmental cost.

FIG. 1 sets forth a flow diagram of the present invention process carried forward to manufacture articles from the present invention wood substitute. In accordance with the present invention, at step 10 an initial mixture is formed in dry form of polymer such as a recycled polymer, lignin, wood flour and/or wood fiber. At step 11, the present invention process provides for the addition of additives for insecticides, fungicides and/or algaecides. Other additives such as color or UV inhibitors may also be added at step 1. Thereafter, at step 12, the determination is made as to whether the mixture is to be utilized directly in an extruder or stored for future use. In the event the mixture is not to be used directly, the present invention process moves to step 13 in which the mixture is pelletized, that is formed into dry pellets, and stored. In the event, however, the mixture is to be used directly, the mixture is then fed to a compound extruder. In the event pelletized and previously stored material is used, the pellets are added to a compound extruder. Whether fed directly or stored and then later fed to the extruder, the present invention process is carried forward at step 14 in which the compound extruder forms a molten liquid material of the mixture by subjecting the mixture to elevated temperature and elevated pressures.

In accordance with an important aspect of the present invention, a foaming agent such as wood flour is added at step 15 to the mixture prior to extrusion. At step 16, the molten mixture is extruded to an enlarged size having the desired eventual shape. Thereafter, at step 17, the enlarged size extrusion is fed into a series of progressively reduced size vacuum sizers which form and cool the enlarged extrusion to the desired shape and size. During the vacuum sizing of step 17, the above-mentioned foaming process takes place within the extrusion and water is drawn outwardly through the walls of the vacuum sizes carrying heat from the extrusion and thereby cooling it as it is progressively reduced to the desired size. Once the cooling and sizing is complete, the system moves to a step 18 in which a final cooling process using a water bath is applied to the extrusion. Thereafter, at step 19, the cooled and sized extrusion is cut to the desired length and the process is complete.

Alternatively, the present invention may utilize injection molding step 20 following step 15. Injection molding forms a molded article having a dense outer surface and lower density foam interior.

Figure 2:
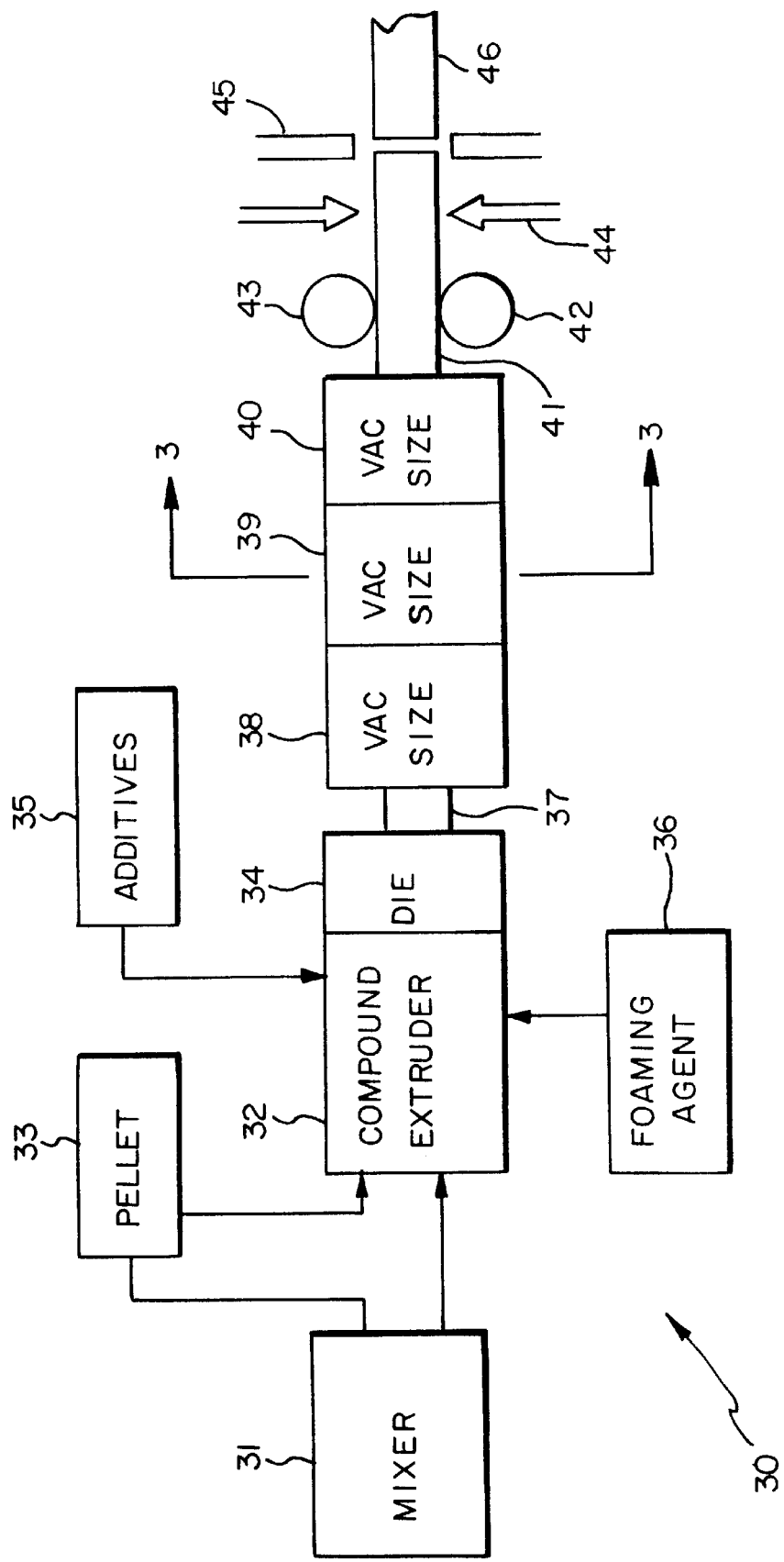
FIG. 2 sets forth a block diagram of a manufacturing apparatus utilizing the present invention method of manufacture for processing the present invention wood substitute.

FIG. 2 sets forth a block diagram of the present invention method of manufacturing a wood substitute article using apparatus generally referenced by numeral 30. Apparatus 30 includes a mixer 31 which may utilize a conventional dry material mixer to mix the above-described combination of a polymer base, lignin, wood flour and/or wood fiber. The dry mix once combined within mixer 31 may alternatively be transferred to a pelletizer 33 in which the dry mixture is compressed to form a quantity of small pellets which may be easily stored for future use. In the event the process is utilizing previously pelletized and stored material, the pelletized mixture is transferred to a conventional compound extruder 32. Alternatively, the mixture from mixer 31 may be transferred directly to compound extruder 32 as needed. Within compound extruder 32, the mixture is subjected to elevated temperature and pressure forming the mixture into a liquid molten material. Concurrently, within compound extruder 32, various additives 35 as described above which may, for example, include insecticides, fungicides, algaecides are added. In addition, other custom materials such as UV inhibitors or colorants may also be added to compound extruder 32. In its preferred form, extruder 32 comprises a vented extruder which allows volatile material to be vented from the extruder as the molten material is processed. In addition and in accordance with an important aspect of the present invention, a supply of foaming agent 36 supplies a foaming agent such as wood flour to extruder 32 as the molten material is extruded through an extrusion die 34. Die 34 is a conventional cooled extrusion die having a passage therethrough which defines the cross-section of the to-be-extruded article. In further accordance with an important aspect of the present invention, the extrusion passage within die 34 is an enlarged version of the eventual shape to be imparted to the extruded article. While the degree of enlargement may be selected or varied in accordance with manufacturing needs, an exemplary extruded enlargement of one hundred twelve percent has been found to be advantageous for most manufacturing needs.

Thus, an enlarged "billet" 37 emerges from die 34 having a shape corresponding to the eventually desired article and an enlarged cross-sectional size. Billet 37 is then passed through a plurality of successive vacuum sizes 38, 39 and 40 which subject the enlarged billet to conditions of vacuum and which further shapes the profile of billet 37 to the desired dimensions through successive shaping and reduction. It will be apparent to those skilled in the art that while a trio of successive vacuum sizers is shown in the embodiment of FIG. 2, a different number of sizers may be utilized as needed without departing from the spirit and scope of the present invention. The essential functions with respect to the present invention which vacuum sizers 38 through 40 accomplish is the reduction of the cross-section or profile of the extruded billed and the successive cooling of the billet. A substantial portion of the cooling which occurs within vacuum sizers 38 through 40 is accomplished as water within the molten billet is drawn over and around the molten material causing it to vaporize. The vaporization of the water as it is vacuumed-drawn from the billet creates a cooling effect which removes substantial heat from the billet.

As a result of the sizing operation of vacuum sizers 38 through 40 and the cooling process therein, a properly sized elongated billet 41 emerges from sizers 38 through 40. For purposes of illustration, a pair of pullers 42 and 43 are shown applied to billet 41. Pullers 42 and 43 are representative of standard billet pullers which may be located in different numbers and at different positions along the travel path of the extruded billet as it proceeds form die 34 through sizers 38 through 40 and eventually to cutter 45. The final cooling process operative upon billet 41 after being drawn from vacuum sizers 38 through 40 is provided by a conventional water bath 44. Once the billet is fully cooled, a conventional cutter 45 operates to separate the elongated billet into a plurality of extruded articles such as article 46 having the desired length.

In accordance with an important aspect of the present invention, the above-mentioned foaming process within the cooling billet as it passes through vacuum sizers 38 through 40 results in a lower density foam center for the cooled billet while nonetheless maintaining the desired surface densities and characteristics. The degree of foaming is dependent to a substantial extent upon the percentage of wood flour to plastic within the mixture formed within compound extruder 32. It has been found that percentages varying from five percent to sixty percent ratios of wood flour to plastic have produced the desired range of results. A lower percentage of wood flour increases the degree of foaming and reduces the overall weight of the extruded article. Conversely, an increased percentage of wood flour reduces the amount of foaming within the material resulting in a heavier extruded article. In the initial mixing when higher concentrations of wood flour are required, additional wood flour at five to fifteen percent is needed for addition to the pelletized material. The wood flour then serves as an efficient and economical foaming agent.

The physical properties as well as appearance of the finished article may be substantially altered by varying the proportions of base plastic or polymer to wood flour together with the timely introduction of foaming agent's color or performance enhancing materials. The design feature of the mixing, compounding and extrusion equipment utilized in the inventive process are such that venting, foaming, adding color and concentrates of base material can be carried forward at the opportune point in the manufacturing process.

In further accordance with the present invention, the inventive wood substitute material may be process using conventional injection molding rather than extrusion. The principles applicable to the injection molding process are substantially the same in that the material when injection into a mold cavity tends to form at its interior region due to the addition of foaming agents. The result is an injection molded article having a desirable surface characteristic and an overall density or weight which may be controlled by controlling the degree of foaming in the molded article. The result is an injection moldable wood substitute having superior qualities to other prior art materials such as so-called "plastic wood".

Figure 3:
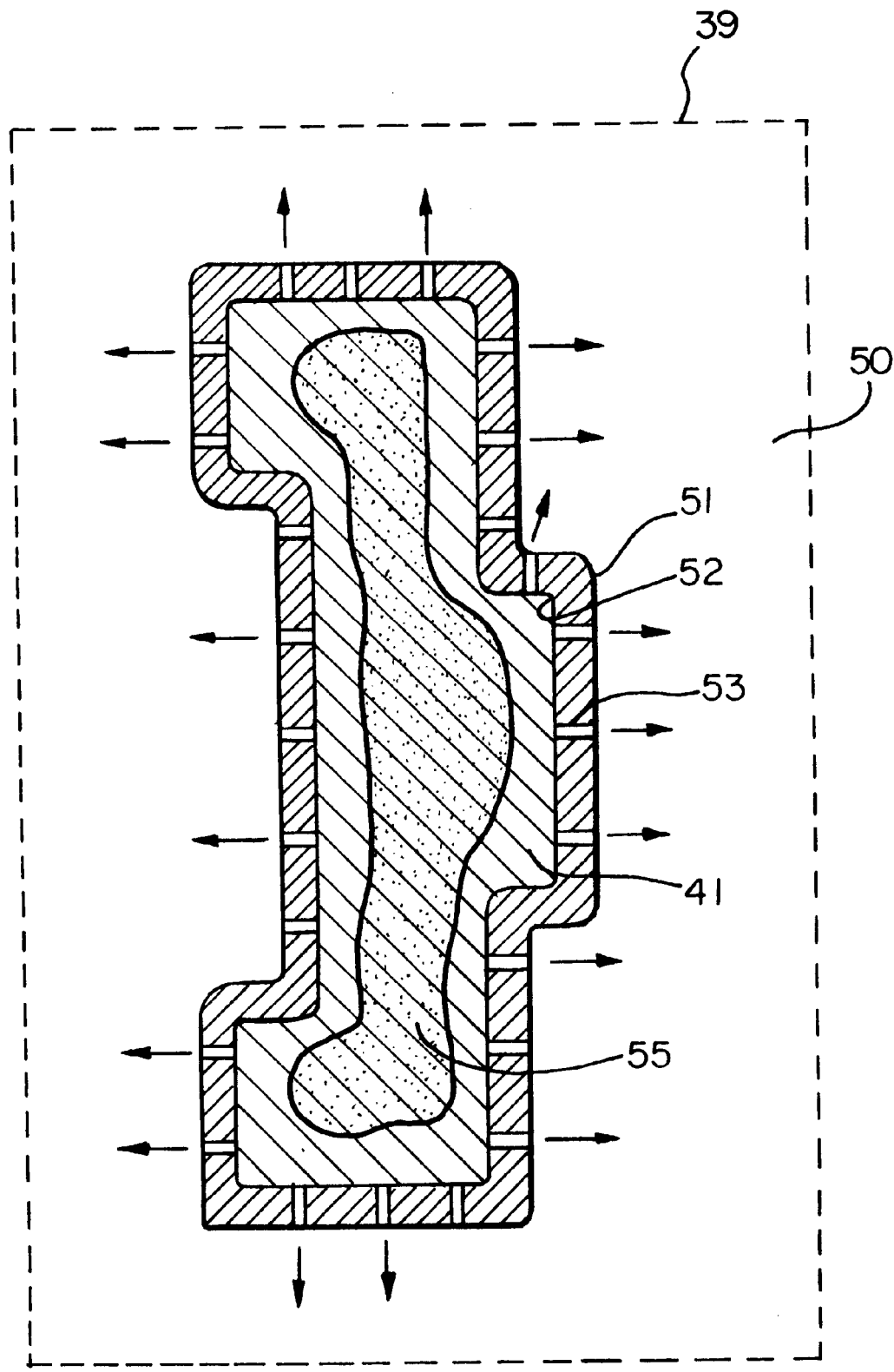
FIG. 3 sets forth a section view of a vacuum sizer taken along section lines 3—3 in FIG. 2.

FIG. 3 sets forth an illustrative section view of vacuum sizer 39. It will be understood by those skilled in the art that vacuum sizers such as vacuum sizer 39 are well known in the art and thus FIG. 3 is merely intended to set forth the process within the vacuum sizers which results in interior foaming of the extruded item. Accordingly, vacuum sizer 39 shown in dashed outline includes an internal shaper 51 defining an interior passage 52 therethrough. Interior passage 52 corresponds to the profile or cross-sectional shape of the extruded item. In addition and in accordance with conventional fabrication techniques, interior passage 52 is angled in a converging shape along its major axis to provide a progressively smaller cross-section passage dimension in the direction of billet travel. While the degree of passage reduction may be varied somewhat to accommodate the particular density of material processed and the number of vacuum sizers being employed as well as the amount of enlargement of the extruded item, it has been found that a combination of three vacuum sizers each having approximately three degrees of angular size reduction within their respective interior passages is highly effective. In accordance with conventional fabrication techniques, shaper 51 further defines a large number of apertures 53 extending through the walls of shaper 51 exposing interior passage 52 to vacuum environment 50 within the vacuum sizer. It will be understood that the number and placement of apertures 53 is for illustrative purposes only and that in a practical vacuum sizer a substantially different number of apertures may be required.

Within interior passage 52 of shaper 51, extruded item 41 is drawn to produce the above-described size reduction.

Concurrently, the above-described foaming action within extruded item 41 takes place within the vacuum sizers creating a foam interior region 55. For purposes of illustration, foam interior region 55 is shown having a defined outer boundary. As a practical matter, however, the boundary of foam interior 55 and the degree of foaming is a gradual less defined characteristic. Thus, foam interior 55 would typically have its lowest density near the interior most portions of extruded item 41 with a gradual increase in density and reduction of foaming outwardly from the low density interior.

During the above-described vacuum sizing process, water within extruded item 41 is drawn outwardly through apertures 55 into vacuum environment 50. In this process, the water carries heat outwardly from extruded item 41 and the vaporization of the water further increases the heat extracted from extruded item 41. Thus, the extruded item forms a foam interior 55 and an outer surface having a high density during the sizing process. The greater density of the extruded item near its outer surfaces provides the desired surface characteristics for the wood substitute article while the foam interior portion reduces the overall weight of the article.

What has been shown is a novel wood substitute and method of manufacture of articles therefrom in which a variety of materials many of which are otherwise discarded and wasted are utilized in a recycling process which produces an environmentally favorable wood substitute article. The inventive method of manufacture together with the inventive wood substitute material cooperate to provide a cost effective viable commercially realizable wood substitute which is of particular benefit in avoiding the waste otherwise resulting from manufacture of similar articles from virgin wood. The process and material readily accommodate extruding and injection molding processes. The overall density of the wood substitute article may be controlled by inducing the desired amount of foaming within the article during its cooling process.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method of forming a wood substitute article comprising the steps of:

mixing a base polymer, wood flour and lignin to form a mixture;

compounding said mixture under elevated pressure and temperature to form a molten material;

adding a foaming agent to said molten material;

extruding said molten material to an enlarged cross-section billet;

vacuum sizing said enlarged cross-section billet by passing it through a plurality of serially-arranged progressively-reduced cross-section vacuum sizers to progressively reduce the cross-section thereof, cool said billet and allow a foaming action to occur within said billet to form a reduced size cooled billet; and final cooling said reduced size billet.

2. The method of claim 1 further including the step of adding insecticide, fungicide and/or algaecide materials during said compounding step.

3. The method of claim 2 further including the steps of:

forming pellets of said mixture prior to said compounding step; and temporarily storing said pellets prior to said compounding step.

4. The method of claim 3 wherein said foaming agent used in said step of adding a foaming agent is wood flour.

5. The method of claim 4 wherein said step of final cooling includes applying a water bath to said reduced size billet.

* * * * *